United States Patent
Johnson et al.

(10) Patent No.: US 9,729,309 B2
(45) Date of Patent: Aug. 8, 2017

(54) SECURING DATA TRANSMISSION BETWEEN PROCESSOR PACKAGES

(71) Applicant: Intel Corporation, Santa Clara, CA (US)

(72) Inventors: Simon Johnson, Beaverton, OR (US); Abhishek Das, Portland, OR (US); Carlos Rozas, Portland, OR (US); Uday Savagaonkar, Portland, OR (US); Robert Blankenship, Tacoma, WA (US); Kiran Padwekar, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 13/719,939

(22) Filed: Dec. 19, 2012

(65) Prior Publication Data

US 2014/0173275 A1    Jun. 19, 2014

(51) Int. Cl.
*G06F 21/00* (2013.01)
*H04L 29/06* (2006.01)
*H04L 9/32* (2006.01)
*H04L 9/00* (2006.01)

(52) U.S. Cl.
CPC ............ *H04L 9/00* (2013.01); *H04L 9/32* (2013.01); *H04L 9/3244* (2013.01); *H04L 63/0428* (2013.01); *H04L 63/123* (2013.01)

(58) Field of Classification Search
CPC ...... G06F 21/60; G06F 21/71; G06F 21/0806; H04L 63/08; H04L 63/123; H04L 63/0428; H04L 9/32; H04L 9/3244; H04W 12/06
See application file for complete search history.

(56) References Cited

U.S. PATENT DOCUMENTS

| | | | |
|---|---|---|---|
| 7,370,210 B2 * | 5/2008 | Symes | 713/189 |
| 7,600,080 B1 * | 10/2009 | Bhattacharyya et al. | 711/143 |
| 2004/0054914 A1 | 3/2004 | Sullivan | |
| 2004/0177269 A1 * | 9/2004 | Belnet et al. | 713/200 |
| 2007/0157211 A1 | 7/2007 | Wang et al. | |
| 2007/0180270 A1 * | 8/2007 | Kumagai et al. | 713/193 |
| 2008/0162661 A1 * | 7/2008 | Mannava et al. | 709/213 |
| 2010/0174897 A1 | 7/2010 | Schumacher | |
| 2011/0239297 A1 | 9/2011 | Unagami et al. | |
| 2012/0066489 A1 | 3/2012 | Ozaki et al. | |
| 2012/0084573 A1 * | 4/2012 | Rudelic et al. | 713/193 |
| 2012/0174216 A1 * | 7/2012 | Vukovic et al. | 726/22 |
| 2013/0275770 A1 * | 10/2013 | Berger | 713/189 |
| 2013/0318325 A1 * | 11/2013 | Beausoleil et al. | 712/30 |

OTHER PUBLICATIONS

International Search Report and Written Opinion received for PCT Patent Application No. PCT/US2013/047279, mailed on Oct. 15, 2013, 12 pages.

* cited by examiner

*Primary Examiner* — Hadi Armouche
*Assistant Examiner* — Shahriar Zarrineh
(74) *Attorney, Agent, or Firm* — Thomas R. Lane

(57) ABSTRACT

Embodiments of an invention for securing transmissions between processor packages are disclosed. In one embodiment, an apparatus includes an encryption unit to encrypt first content to be transmitted from the apparatus to a processor package directly through a point-to-point link.

11 Claims, 4 Drawing Sheets

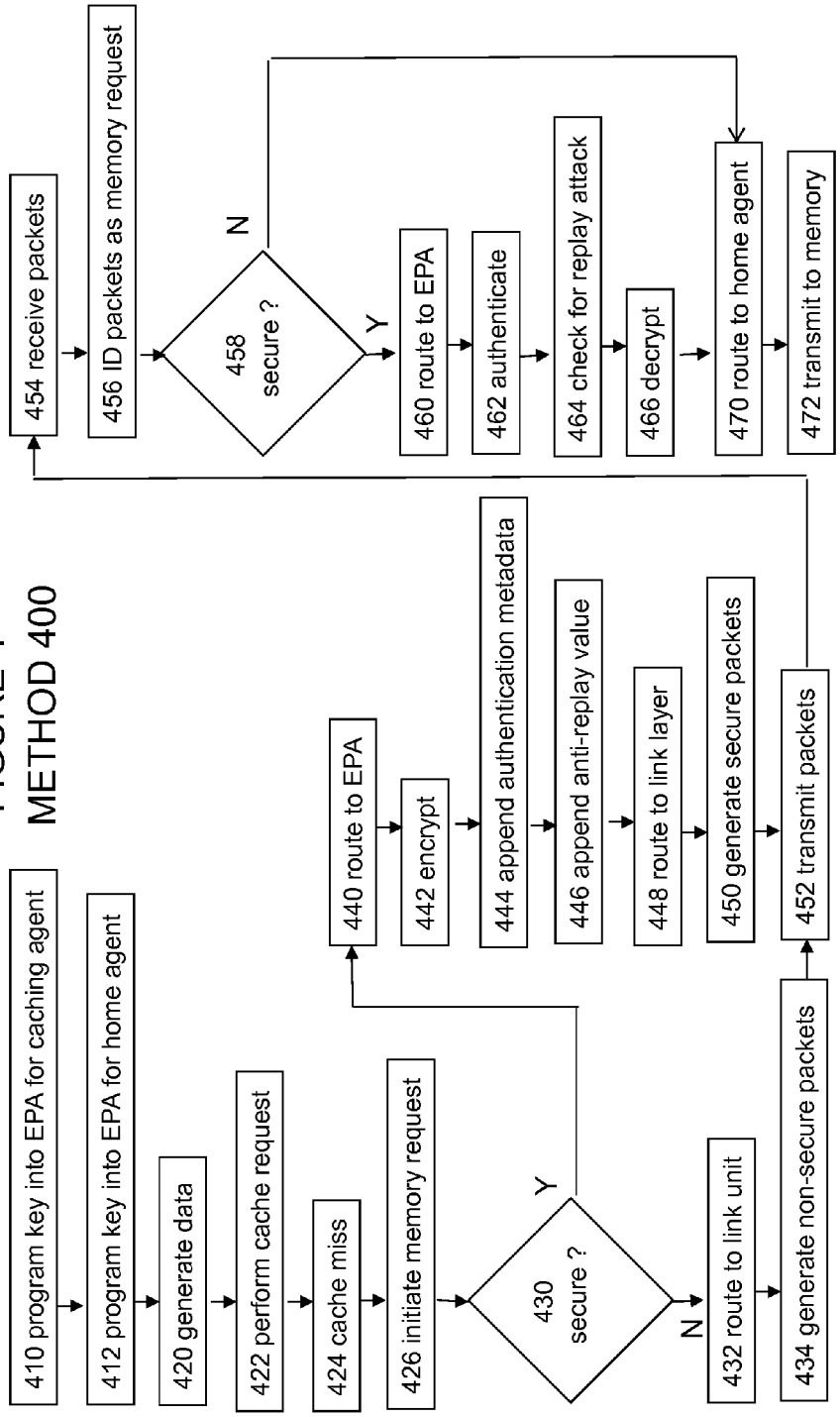

SECURING DATA TRANSMISSION BETWEEN PROCESSOR PACKAGES

BACKGROUND

1. Field

The present disclosure pertains to the field of information processing, and more particularly, to the field of security in information processing systems.

2. Description of Related Art

Malicious attacks are a serious threat to the security of information processing systems. Many techniques have been developed to defend against these attacks, but more are needed as information processing system development continues.

BRIEF DESCRIPTION OF THE FIGURES

The present invention is illustrated by way of example and not limitation in the accompanying figures.

FIG. 4 illustrates a method for securing data transmissions between processor packages according to an embodiment of the present invention.

DETAILED DESCRIPTION

Embodiments of an invention for securing data transmissions between processor packages are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Figure 1:
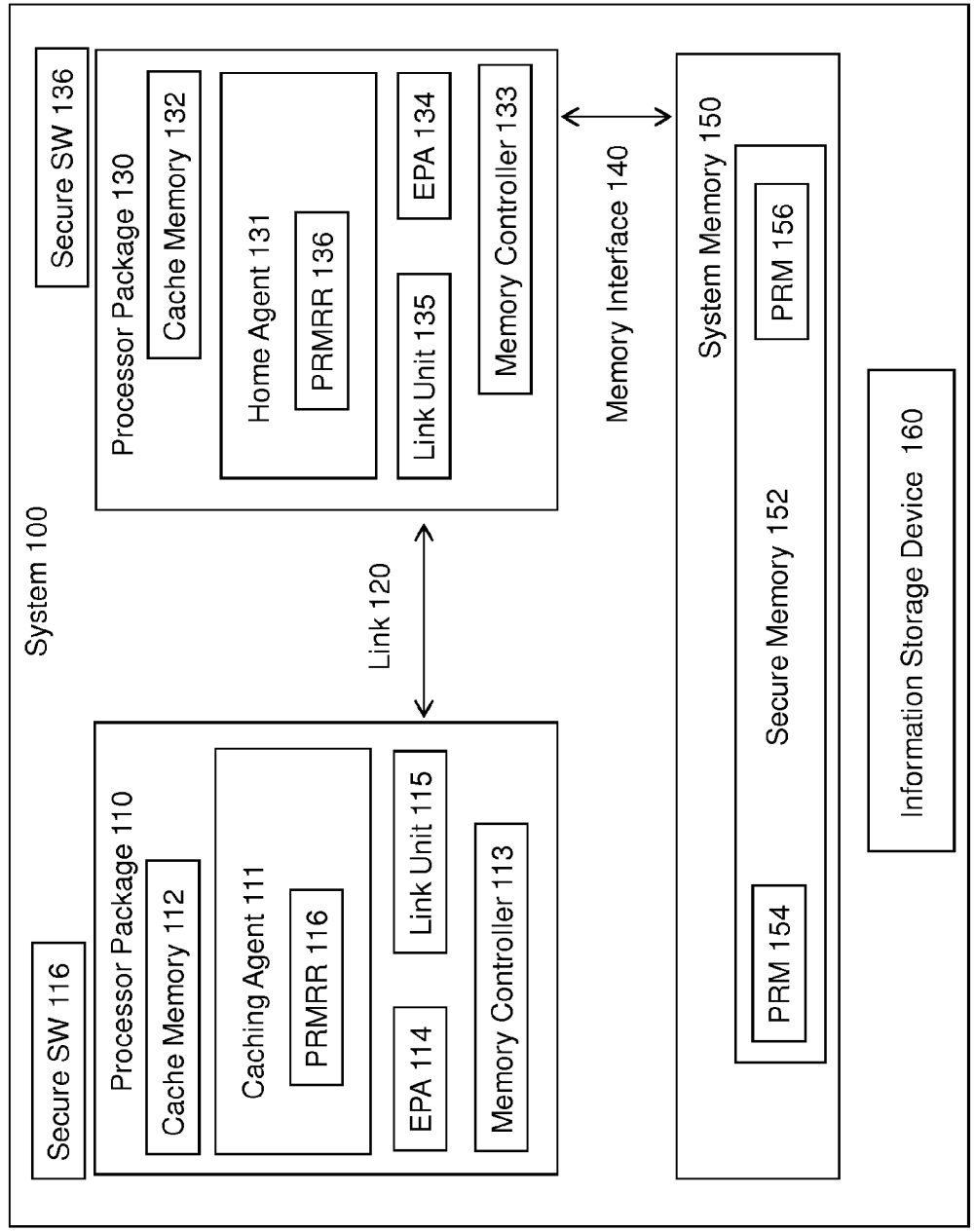
FIG. 1 illustrates a system in which data transmissions between processor packages may be secured according to an embodiment of the present invention.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor package 110, inter-package link 120, processor package 130, memory interface 140, system memory 150, and information storage device 160. Processor package 110 and processor package 130 are coupled to each other through inter-package link 120. Processor package 130 and system memory 150 are coupled to each other through memory interface 140. Systems embodying the present invention may include any number of each of these components and any other components or other elements, such as information storage devices, peripherals, and input/output devices. Any or all of the other components or other elements in any system embodiment, such as information storage device 160, may be connected, coupled, or otherwise in communication with each other through any number of buses, point-to-point, or other wired or wireless interfaces or connections.

Processor package 110 may include one or more processors packaged within a single package, each of which may include multiple threads and/or multiple execution cores, in any combination. Each processor may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

Processor package 110 includes caching agent 111, cache memory 112, memory controller 113, encryption proxy agent 114, and link unit 115. Caching agent 111 may represent any processor as set forth above, which in this embodiment serves as a caching agent for purposes of this description. Cache memory 112 may represent any one or more levels of cache memory in a memory hierarchy of system 100, implemented in static random access memory or any other memory technology. Cache memory 112 may include any combination of cache memories dedicated to or shared among any one or more execution cores or processors within processor package 110 according to any known approaches to caching in information processing systems.

Encryption proxy agent 114 may include any logic, circuitry, or other hardware to execute one or more encryption algorithms and the corresponding decryption algorithms. Link unit 115 may include any circuitry or other hardware with which processor package 110 may communicate another processor package in system 100 through a point-to-point link.

Inter-package link 120 may represent a point-to-point interface, which may be a point-to-point link in an interconnect fabric according to any system interconnect architecture, such as that of Intel® Quick Path Interconnect or an embodiment of a High Performance Interconnect described in the U.S. Patent application entitled Method, Apparatus, System for a High Performance Interconnect architecture, filed Oct. 22, 2012, Ser. No. 61/717,091, which is incorporated herein by reference. Data, control information, or other information may be transmitted or otherwise sent from processor package 110 to processor package 130 in packets according to the protocol of any such architecture.

Processor package 130 includes home agent 131, cache memory 132, memory controller 133, encryption proxy agent 134, and link unit 135. Home agent 131 may represent any processor as set forth above, which in this embodiment serves as a home agent for purposes of this description. Cache memory 132 may represent any one or more levels of cache memory in a memory hierarchy of system 100, implemented in static random access memory or any other memory technology. Cache memory 132 may include any combination of cache memories dedicated to or shared among any one or more execution cores or processors within processor package 130 according to any known approaches to caching in information processing systems.

Encryption proxy agent 134 may include any logic, circuitry, or other hardware to execute one or more encryption algorithms and the corresponding decryption algorithms and to provide the other functionalities described below. Link unit 135 may include any circuitry or other hardware with which processor package 130 may communicate with another processor package in system 100 through a point-to-point link.

Memory interface 140 may represent any type of interface between a memory and a processor. System memory 150 may include dynamic random access memory and/or any other type of medium accessible by processor 110 and/or 130, and may be used to store data and/or instructions used or generated by processor 110, processor 130, and/or any other components. Memory interface 140 is shown between processor package 130 and system memory 150; however, system memory 150 may represent a portion of a larger system memory, where the portion is locally attached to processor package 130 through memory interface 140. Similarly, a portion of the larger system memory may also be locally attached to processor package 110 through memory interface 140 and/or another memory interface not shown. Information storage device 160 may represent any type of non-volatile information storage device, such as flash memory or a hard disk drive.

FIG. 1 also illustrates secure software modules 116 and 136, which may be secure software or firmware running, executing, loaded, or otherwise present on or in caching agent 111 and home agent 131, respectively. Secure software module 116 may program encryption proxy agent 114 with a cryptographic key, and secure software module 136 may program encryption proxy agent 134 with the same or a corresponding cryptographic key, such that encryption proxy agent 134 may decrypt data encrypted by encryption proxy agent 114, and vice versa. Any type of cryptographic key or keys may be used within the scope of the present invention. Embodiments of the present invention may include using a first cryptographic key or other data provided by a secure software module to derive a second cryptographic key for encryption and decryption.

Figure 2:
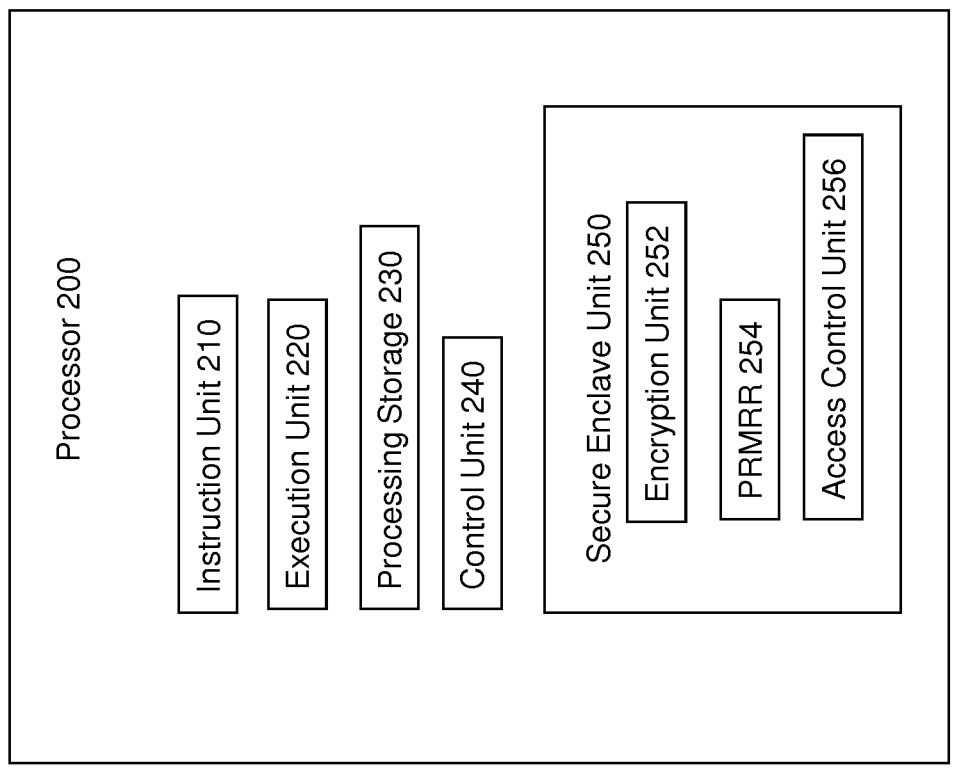
FIG. 2 illustrates a processor according to an embodiment of the present invention.

FIG. 2 illustrates processor 200, an embodiment of which may serve as caching agent 111 and an embodiment of which may serve as home agent 131 in system 100. Processor 200 may include instruction unit 210, execution unit 220, processor storage 230, processor control unit 240, and secure enclave unit 250. Processor 200 may also include any other circuitry, structures, or logic not shown in FIG. 2. For example, a cache memory, a memory controller, an encryption proxy agent, and/or a link unit that may serve as an embodiment of cache memory 112 or 132, memory controller 113 or 133, encryption proxy agent 114 or 134, and link unit 115 or 135, respectively, may be integrated on the substrate of processor 200.

Instruction unit 210 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 220.

Execution unit 220 may include any circuitry, structure, or other hardware, such as an arithmetic unit, logic unit, floating point unit, shifter, etc., for processing data and executing instructions, micro-instructions, and/or micro-operations.

Processing storage 230 may represent any type of storage usable for any purpose within processor 200; for example, it may include any number of data registers, instruction registers, status registers, configuration registers, control registers, other programmable or hard-coded registers or register files, or any other storage structures.

Processor control unit 240 may include any logic, circuitry, hardware, or other structures, including microcode, state machine logic, or programmable logic, to control the operation of the units and other elements of processor 200 and the transfer of data within, into, and out of processor 200. Processor control unit 240 may cause processor 200 to perform or participate in the performance of method embodiments of the present invention, such as the method embodiments described below, for example, by causing processor 200 to execute instructions received by instruction unit 210 and micro-instructions or micro-operations derived from instructions received by instruction unit 210.

Secure enclave unit 250 may represent any logic, circuitry, hardware, or other structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although embodiments of the present invention are not limited to those using a secure enclave as the secured, protected, or isolated environment. In one embodiment, a secure enclave may be created and maintained using instructions in the instruction set of a processor in the Intel® Core® Processor Family or other processor family from Intel® Corporation.

All or part of secure enclave unit 250 may be included within any one or more other units of processor 200, such as those corresponding to instruction unit 210, execution unit 220, processor storage 230, and processor control unit 240. Secure enclave unit 250 may include encryption unit 252, which may include any logic, circuitry, or other hardware to execute one or more encryption algorithms and the corresponding decryption algorithms, and may include logic, circuitry, or other hardware shared with another encryption unit such as encryption proxy agent 114 and/or 134.

Each secure enclave created within system 100 may be allocated a secure or protected space within the system memory space supported by system memory 150. Secure memory 152 represents one or more such secure or protected memory spaces. Each such memory space may be created, allocated, and maintained using known virtual memory, secure enclave, or other system memory addressing techniques such that the information within each such memory space may at various times be stored within any combination of information storage device 160, system memory 150, any of cache memories 112 and/or 132, any processor storage in caching agent 110 and/or home agent 130 represented by processor storage 230, and/or any other memory or storage area within information processing system 100.

Secure memory 152 may include one or more physically contiguous ranges of memory called processor reserved memory (PRM). In one embodiment, a PRM is naturally aligned and has a size that is an integer power of two. System firmware such as a basic input/output system may reserve a PRM, for example by setting a pair of model-specific registers (MSRs), collectively known as a PRM range register (PRMRR). In the embodiment of FIG. 2, secure enclave logic 250 may include PRMRR 254, embodiments of which may serve as PRMRR 116 and PRMRR 136 in FIG. 1. PRMRR 116 may be used to reserve PRM 154 for caching agent 111 and PRMRR 136 may be used to reserve PRM 156 for home agent 131.

Secure enclave unit 250 may also include access control unit 256, which may include any logic, circuitry, hardware, or other structures to enforce load and access restrictions using PRMRR 254 such that the information within the memory space of a secure enclave is accessible only to the application running in that secure enclave. For example, the information on a memory page allocated to a secure enclave may be encrypted by encryption unit 252 before being stored in system memory 150, information storage device 160, or any other memory or storage external to processor 200. While stored external to processor 200, the information is protected by encryption and integrity check techniques. When the memory page is loaded into a cache memory of a processor by an application or process running on that processor within the secure enclave to which the page is allocated, it is decrypted by encryption unit 252, then the unencrypted information is accessible only by an application or process running within the secure enclave.

Figure 3:
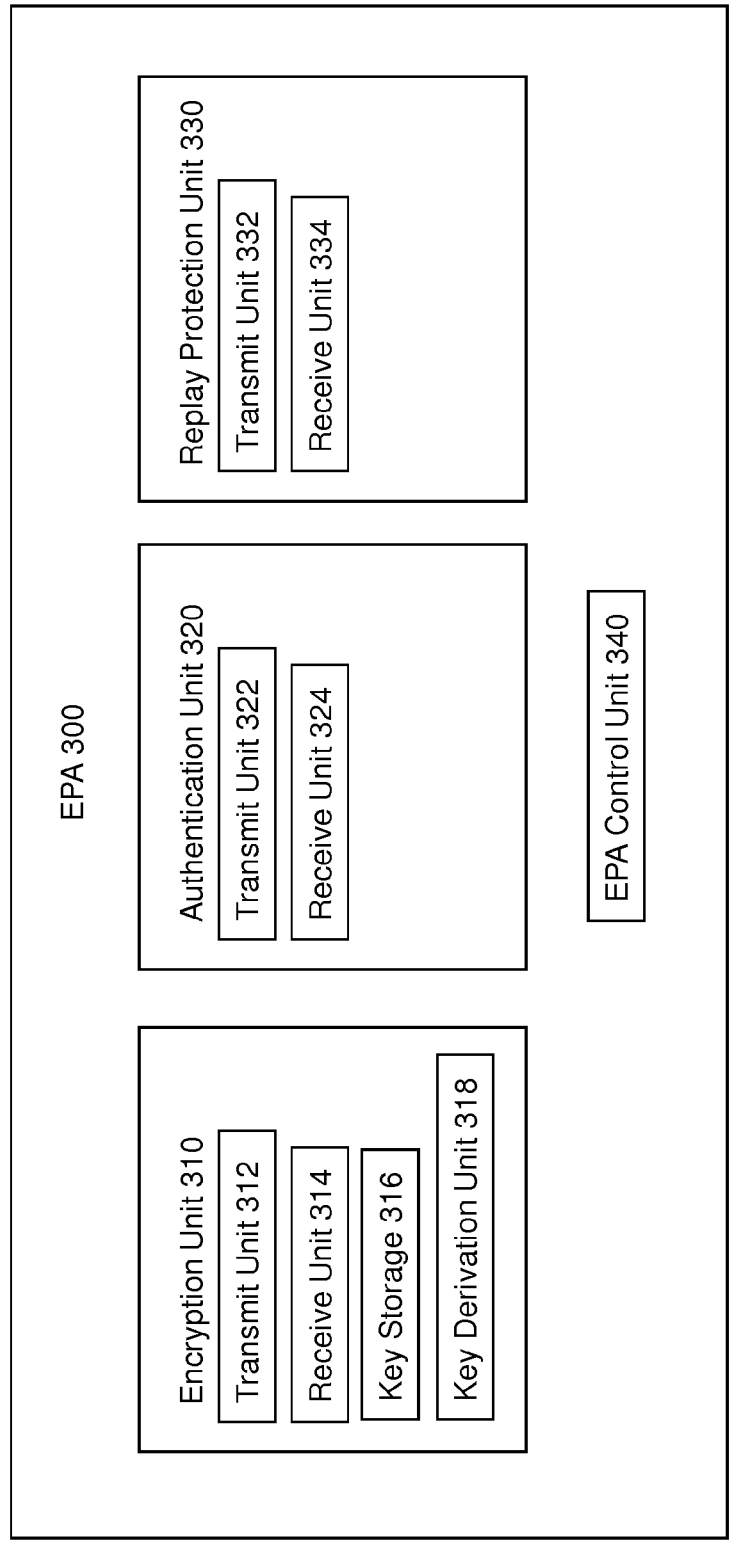
FIG. 3 illustrates an encryption proxy agent according to an embodiment of the present invention.

FIG. 3 illustrates encryption proxy agent (EPA) 300, embodiments of which may serve as an EPA 114 and EPA 134 in system 100. In one embodiment, the hardware in EPA 300 is dedicated or unshared, which means that is not shared with the hardware in any processor execution core on the same substrate or in the same package. In other embodiments, hardware may be shared between an EPA and one or more processor cores.

EPA 300 may include encryption unit 310 to execute one or more encryption algorithms and the corresponding decryption algorithms. Any one or more cryptographic algorithms may be used within the scope of the present invention. Encryption unit 310 may include transmit unit 312 to encrypt content to be transmitted or otherwise sent, in one or more packets, from one processor package to another processor package directly through a point-to-point link. Encryption unit 310 may also include receive unit 314 to decrypt content received, in one or more packets, from one processor package to another processor package directly through a point-to-point link. Encryption unit 310 may also include secure key storage 316 to store a cryptographic key to be used to encrypt and decrypt content to be transmitted or otherwise sent, in one or more packets, from one processor package to another processor package directly through a point-to-point link. Encryption unit 310 may also include key derivation unit 318 to derive a second cryptographic key from a first cryptographic key or other data received by EPA 300.

EPA 300 may also include authentication unit 320 to authenticate data or other information transmitted between processor packages directly through a point-to-point link. Any authentication technique may be used within the scope of the present invention. Authentication unit 320 may include transmit unit 322 to generate and append or otherwise provide authentication metadata, such as a header or signature, to content to be transmitted or otherwise sent, in one or more packets, from one processor package to another processor package directly through a point-to-point link. Authentication unit 320 may also include receive unit 324 to verify the authenticity of content received, in one or more packets, by one processor package from another processor package directly through a point-to-point link.

EPA 300 may also include replay protection unit 330 to protect from replay attacks data or other information transmitted between processor packages directly through a point-to-point link. Any replay protection technique may be used within the scope of the present invention. Replay protection unit 320 may include transmit unit 332 to generate and append or otherwise provide replay protection information, such as a monotonic counter value, random number, and/or an integrity check value, to content to be transmitted or otherwise sent, in one or more packets, from one processor package to another processor package directly through a point-to-point link. Replay protection unit 320 may also include receive unit 334 to verify replay protection information of content received, in one or more packets, by one processor package from another processor package directly through a point-to-point link.

EPA 300 may also include EPA control unit 340, which may include any logic, circuitry, hardware, firmware, other structures, microcode, state machine logic, and/or programmable logic to control the operation of the units and other elements of EPA 300. EPA control unit 340 may cause EPA 300 to perform or participate in the performance of method embodiments of the present invention, such as the method embodiments described below.

FIG. 4 illustrates method 400 for securing data transmissions between processor packages according to an embodiment of the present invention. Although method embodiments of the invention are not limited in this respect, reference may be made to elements of FIGS. 1, 2, and 3 to help describe the method embodiment of FIG. 4.

In box 410, secure software module 116 programs EPA 114 with a cryptographic key. In box 412, secure software module 136 programs EPA 134 with the same or a corresponding cryptographic key, such that EPA 134 may decrypt data encrypted by EPA 114, and vice versa.

In box 420 of method 400, the operation of a processor within processor package 110 generates data to be stored in a first memory address. In box 422, caching agent 111 performs a cache request to determine whether the first memory address is within cache memory 112. In box 424, the cache request misses because the first memory address is not within cache memory 112. In box 426, in response to the missed cache request, a memory request to write the data to system memory 150 is initiated.

In box 430, it is determined whether the memory request is a secure memory request or a non-secure memory request. For example, it may be determined, using PRMRR 116, whether the first memory address is within the address range of secure memory 152, in which case the memory request it is determined that the memory request is a secure memory request. If the memory request is a secure memory request, then method 400 continues in box 440. If the memory request is a non-secure memory request, then method 400 continues in box 432.

In box 432, the memory request is routed to link unit 115. In box 434, link unit 115 generates one or more packets, including the unencrypted data, to be transmitted. From box 434, method 400 continues to box 452.

In box 440, the memory request is routed to EPA 114. In box 442, EPA 114 encrypts the data. In box 444, EPA 114 appends authentication metadata to the encrypted data. In box 446, EPA 114 appends an anti-replay value to the encrypted data. In box 448, the memory request is routed to link unit 115. In box 450, link unit 115 generates one or more packets, including content representing the encrypted data, the authentication metadata, and the anti-replay value, to be transmitted.

In box 452, the one or more packets are transmitted through inter-package link 120. In box 454, the one or more packets are received by link unit 135. In box 456, link unit 135 determines that the one or more packets correspond to a memory request. In box 458, it is determined whether the memory request is a secure memory request or a non-secure memory request. For example, it may be determined, using PRMRR 136, whether the a memory request is to an address within the address range of secure memory 152, in which case it is determined that the memory request is a secure memory request. If the memory request is a secure memory request, then method 400 continues in box 460. If the memory request is a non-secure memory request, then method 400 continues in box 470.

In box 460, the memory request is routed to EPA 134. In box 462, EPA 134 uses the authentication data to verify the authenticity of the memory request. In box 464, EPA 134 uses the anti-replay value to verify that memory request is not associated with a replay attack. In box 466, EPA 134 decrypts the encrypted data.

In box 470, the memory request is routed to home agent 131. In box 472, home agent 131 transmits the memory request to system memory 150.

In various embodiments of the present invention, the method illustrated in FIG. 4 may be performed in a different order, with illustrated boxes combined or omitted, with additional boxes added, or with a combination of reordered, combined, omitted, or additional boxes. For example, boxes 444 and/or 446 may be performed before box 442, such that the authentication metadata and/or the anti-replay value may also be encrypted. Furthermore, many other method embodiments are possible within the scope of the present inventions, including an embodiment securing a data transmission from a home agent to a cache agent, a data transmission between cache agents, a data transmission between any other types of agents, and a data transmission corresponding to a read or other transaction.

Embodiments or portions of embodiments of the present invention, as described above, may be stored on any form of a machine-readable medium. For example, all or part of method 200 may be embodied in software or firmware instructions that are stored on a medium readable by processor 200 and/or EPA 300, which when executed by processor 200 and/or EPA 300, cause processor 200 and/or EPA 300 to execute an embodiment of the present invention. Also, aspects of the present invention may be embodied in data stored on a machine-readable medium, where the data represents a design or other information usable to fabricate all or part of processor 200 and/or EPA 300.

Thus, embodiments of an invention for securing data transmission between processor packages have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A first processor package comprising:
    first encryption proxy agent hardware including a first key storage in which secure software is to store a key, encryption circuitry to generate encrypted data by using the key to encrypt unencrypted data, and replay protection circuitry to append an anti-replay value to the encrypted data;
    a cache;
    a caching agent including processor circuitry to determine whether a memory address is within the cache, to determine whether the memory address is within a secure memory address range, and, if the memory address is not within the cache or the secure memory address range, to route the unencrypted data to a first link unit, and, if the memory address is not within the cache but is within the secure memory address range, to route the unencrypted data to the first encryption proxy agent hardware; and
    the first link unit including link circuitry to, if the memory address is not within the cache or the secure memory address range, receive the unencrypted data from the caching unit and generate a first plurality of packets to be transmitted directly to a second link unit of a second processor package through a point-to-point link, and to, if the memory address is not within the cache but is within the secure memory address range, receive the encrypted data from the first encryption proxy agent hardware and generate a second plurality of packets to be transmitted directly to the second link unit of the second processor package through the point-to-point link and to be decrypted by second encryption proxy agent hardware in the second processor package, wherein the second encryption proxy agent hardware includes a second key storage in which the secure software is to store the key.

2. The processor package of claim 1, wherein the encryption proxy agent hardware also comprises authentication circuitry to append authentication metadata to the encrypted data.

3. The processor package of claim 1, wherein the encryption circuitry is also to decrypt content received from the second processor package directly through the point-to-point link.

4. The processor package of claim 2, wherein the authentication circuitry is also to verify the authenticity of the content received from the second processor package.

5. The processor package of claim 1, wherein the replay protection circuitry is also to protect the content received from the second processor package from a replay attack.

6. The processor package of claim 1, further comprising a range register to be used to determine whether the memory address is within the secure memory address range.

7. A method comprising:
    storing, by secure software, a key in a first key storage in a first encryption proxy agent in a first processor package;
    storing, by the secure software, the key in a second key storage in the second encryption proxy agent in a second processor package;
    determining whether a memory address is within a cache in the first processor package;
    determining whether the memory address is within a secure memory address range;
    if the memory address is not within the cache or the secure memory address range, routing the unencrypted data to a first link unit in the first processor package;

if the memory address is not within the cache but is within the secure memory address range, routing the unencrypted data to the first encryption proxy agent;

if the memory address is not within the cache but is within the secure memory address range, generating, by the first encryption proxy agent, encrypted data by using the key to encrypt the unencrypted data;

if the memory address is not within the cache but is within the secure memory address range, appending an anti-replay value to the encrypted data;

if the memory address is not within the cache or the secure memory address range, generating, by the first link unit, a first plurality of packets including the unencrypted data;

if the memory address is not within the cache or the secure memory address range, transmitting, by the first link unit, the first plurality of packets directly to a second link unit in the second processor through a point-to-point link;

if the memory address is not within the cache but is within the secure memory address range, generating, by the first link unit, a second plurality of packets including the encrypted data and the anti-replay value;

if the memory address is not within the cache but is within the secure memory address range, transmitting, by the first link unit, the second plurality of packets directly to the second link unit the second processor through the point-to-point link;

if the memory address is not within the cache but is within the secure memory address range, receiving, by the second link unit, the second plurality of packets directly from the first link unit through the point-to-point link;

if the memory address is not within the cache but is within the secure memory address range, using, within the second processor package, the anti-replay value to verify that receiving the encrypted data is not associated with a replay attack;

if the memory address is not within the cache but is within the secure memory address range, using, by the second encryption proxy agent, the key to decrypt the encrypted data.

8. The method of claim 7, further comprising appending authentication metadata to the encrypted data.

9. The method of claim 7, further comprising using, within the second processor package, the authentication metadata to verify the authenticity of the encrypted data.

10. A system comprising:
a first processor package;
a second processor package;
a point-to-point link between the first processor package and the second processor package;
wherein the first processor package includes
 first encryption proxy agent hardware including a first key storage in which secure software is to store a key, first encryption circuitry to generate encrypted data by using the key to encrypt unencrypted data, and replay protection circuitry to append an anti-replay value to the encrypted data;
 a cache;
 a caching agent including processor circuitry to determine whether a memory address is within the cache, to determine whether the memory address is within a secure memory address range, and, if the memory address is not within the cache or the secure memory address range, to route the unencrypted data to a first link unit, and, if the memory address is not within the cache but is within the secure memory address range, to route the unencrypted data to the first encryption proxy agent hardware; and
 the first link unit including link circuitry to, if the memory address is not within the cache or the secure memory address range, receive the unencrypted data from the caching unit and generate a first plurality of packets to be transmitted directly to a second link unit of the Second processor package through the point-to-point link, and to, if the memory address is not within the cache but is within the secure memory address range, receive the encrypted data from the first encryption proxy agent hardware and generate a second plurality of packets to be transmitted directly to the second link unit of the second processor package through the point-to-point link; and
wherein the second processor package includes second encryption proxy agent hardware including a first key storage in which secure software is to store a key and second encryption circuitry to decrypt the encrypted data using the key.

11. The system of claim 10 wherein the second processor package also includes:
a home agent; and
logic to determine that the second plurality of packets is associated with a secure memory request to the home agent.

* * * * *